United States Patent
Hisada

(10) Patent No.: US 9,984,718 B2
(45) Date of Patent: May 29, 2018

(54) OPTICAL DISC RECORDING MEDIUM SUITABLE FOR USE IN STACKED MANNER

(71) Applicant: Panasonic Intellectual Property Management Co., Ltd., Osaka (JP)

(72) Inventor: Kazuya Hisada, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/350,387

(22) Filed: Nov. 14, 2016

(65) Prior Publication Data
US 2017/0270959 A1    Sep. 21, 2017

(30) Foreign Application Priority Data
Mar. 17, 2016    (JP) .................................. 2016-053359

(51) Int. Cl.
*B32B 3/02*    (2006.01)
*G11B 7/24038*    (2013.01)
*G11B 7/24018*    (2013.01)

(52) U.S. Cl.
CPC ...... *G11B 7/24038* (2013.01); *G11B 7/24018* (2013.01)

(58) Field of Classification Search
CPC ........ G11B 7/24; G11B 7/266; G11B 7/24038
See application file for complete search history.

(56) References Cited

U.S. PATENT DOCUMENTS

| 7,197,756 | B2 * | 3/2007 | Lee .......................... | G11B 7/24 720/721 |
| 2003/0127922 | A1 * | 7/2003 | Campbell .............. | H02K 21/14 310/74 |
| 2004/0096618 | A1 * | 5/2004 | Komaki ............... | G11B 7/2542 428/64.4 |
| 2007/0006804 | A1 * | 1/2007 | Kang ..................... | B05C 11/08 118/52 |
| 2007/0154676 | A1 * | 7/2007 | Morita ................... | G11B 7/241 428/64.4 |
| 2010/0129567 | A1 * | 5/2010 | Tsukuda ............. | G11B 7/24038 427/558 |
| 2011/0096655 | A1 * | 4/2011 | Mueller ................... | G11B 7/24 369/283 |

FOREIGN PATENT DOCUMENTS

JP    2003-67990    3/2003

* cited by examiner

*Primary Examiner* — Elizabeth E Mulvaney
(74) *Attorney, Agent, or Firm* — Wenderoth, Lind & Ponack, L.L.P.

(57) ABSTRACT

An optical disc recording medium includes: a substrate; at least one recording layer formed on at least one side of the substrate; and a cover layer formed on the substrate and the recording layer. The cover layer having a first thickness with reference to a surface of the substrate, in an inside of a circle having a first radius from a center of the substrate. The cover layer having a second thickness larger than the first thickness with reference to the surface of the substrate, on a circumference having a second radius longer than the first radius from the center of the substrate. The cover layer having a third thickness smaller than the first thickness with reference to the surface of the substrate, on a circumference having a third radius longer than the first radius and shorter than the second radius from the center of the substrate.

6 Claims, 13 Drawing Sheets

OPTICAL DISC RECORDING MEDIUM SUITABLE FOR USE IN STACKED MANNER

BACKGROUND

1. Technical Field

This disclosure relates to an optical disc recording medium used for recording information.

2. Description of Related Art

The optical disc recording medium is required to have a flat surface. Various methods have been known in order to manufacture an optical disc recording medium having a flat surface.

Japanese Laid-Open Patent Publication No. JP 2003-067990 A discloses an optical recording medium having a light transmission layer formed by a spin coating method. In an outer circumferential portion of a substrate of the optical recording medium, an inclined surface is formed such that the thickness of the substrate is gradually reduced as approaching the edge along the radial direction. As a result, a raised portion, which inevitably appears when using the resin coating of the conventional spin coating method, is accommodated by the inclined surface of the outer circumferential portion, and does not protrude from a surface of an information recording area of the light transmission layer.

SUMMARY

An optical disc library apparatus has been known that includes a recorder and player apparatus, a plurality of optical discs, and a carrier apparatus picking out and transporting any of the plurality of optical discs to the recorder and player apparatus. In such an optical disc library apparatus, in order to store more large amount of data without increasing dimensions of a housing, for example, the plurality of optical discs are stored in a stacked manner so as to reduce a distance between the optical discs as small as possible. However, if a plurality of optical discs having flat surfaces are stacked and brought into close contact with each other, the optical discs adhere to each other, and therefore, a single optical disc cannot easily be picked out.

One non-limiting and exemplary embodiment provides an optical disc recording medium capable of reducing adherence when being stacked on at least another optical disc recording medium.

An optical disc recording medium according to the present disclosure includes: a substrate shaped as a disc; at least one recording layer formed on at least one side of the substrate; and a cover layer formed on the substrate and the recording layer. The cover layer having a first thickness with reference to a surface of the substrate, in an inside of a circle having a first radius from a center of the substrate. The cover layer having a second thickness larger than the first thickness with reference to the surface of the substrate, on a circumference having a second radius longer than the first radius from the center of the substrate. The cover layer having a third thickness smaller than the first thickness with reference to the surface of the substrate, on a circumference having a third radius longer than the first radius and shorter than the second radius from the center of the substrate.

The optical disc recording medium according to this disclosure can reduce adherence when being stacked on at least another optical disc recording medium.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

From now on, embodiments will be described in detail with reference to the drawings as needed. It is noted that unnecessarily detailed descriptions may be omitted. For example, detailed descriptions of well-known facts and repeated descriptions of substantially the same elements may be omitted. This is used for the purpose of avoiding unnecessary redundancy of the following description and facilitating understanding by those skilled in the art.

The drawings show optical disc recording media in their cross-sectional views. For ease of understanding, particularly, the recording media are shown by extracting and enlarging a vicinity of an outer circumferential portion thereof.

The accompanying drawings and the following description are provided for sufficient understanding of this disclosure by those skilled in the art, and it is not intended to limit the subject matter described in claims thereto.

First Embodiment

An optical disc according to a first embodiment will now be described with reference to FIGS. 1 to 10.

Figure 1:
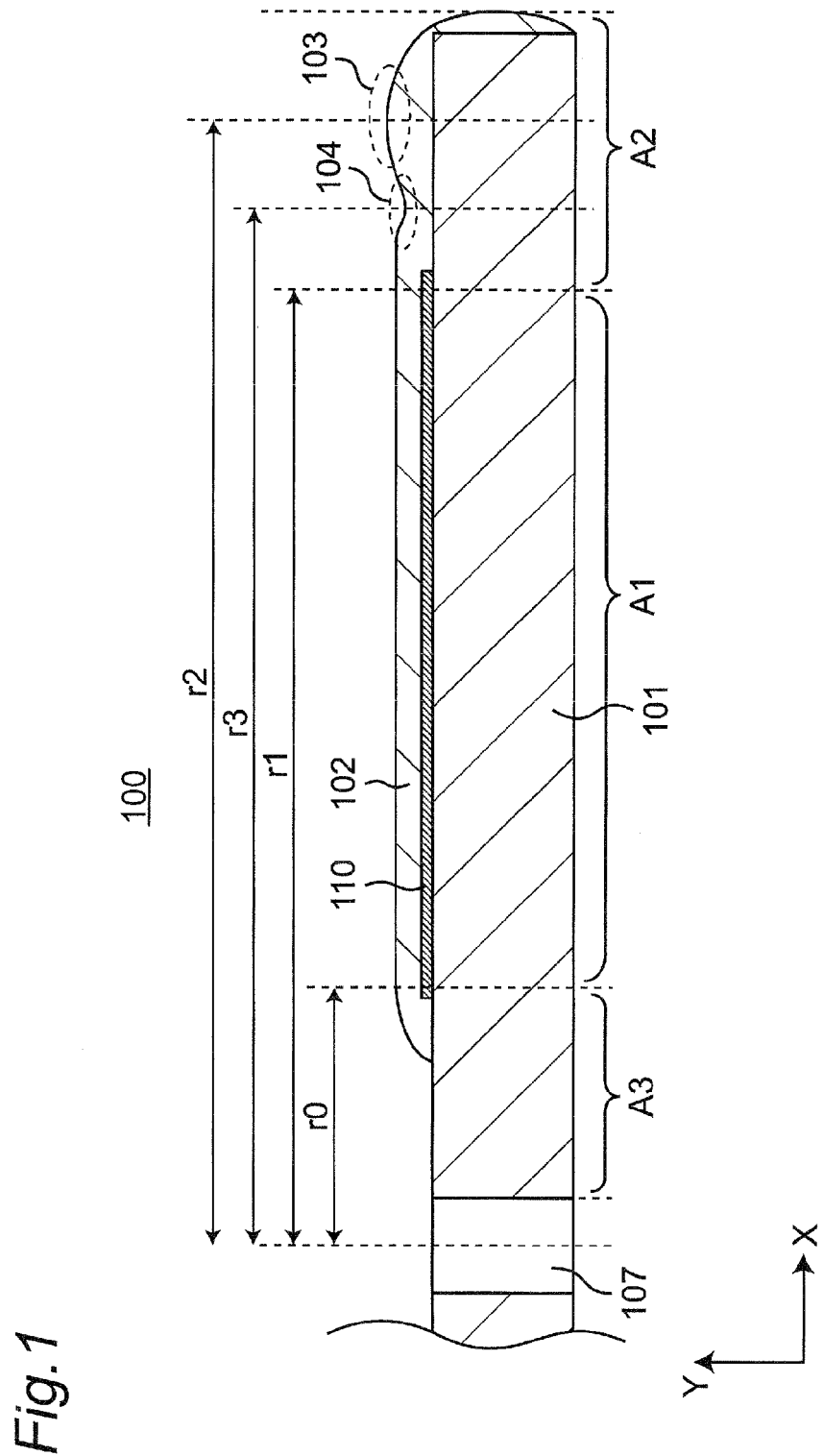
FIG. 1 is a cross-sectional view of an optical disc 100 according to a first embodiment.
Figure 2:
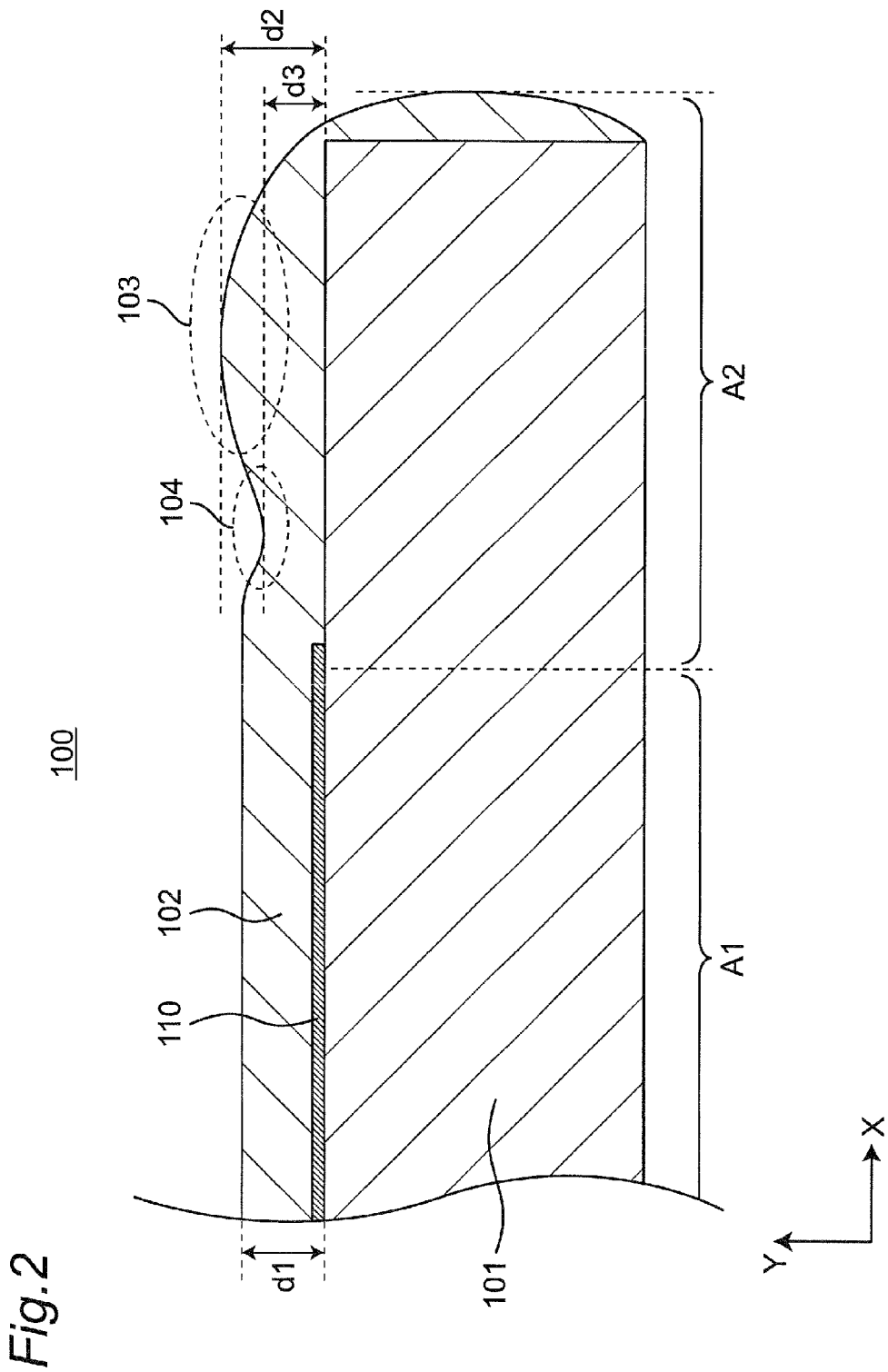
FIG. 2 is a cross-sectional view of a vicinity of an outer circumferential end of the optical disc 100 of FIG. 1.

FIG. 1 is a cross-sectional view of an optical disc 100 according to a first embodiment. FIG. 2 is a cross-sectional view of a vicinity of an outer circumferential end of the optical disc 100 of FIG. 1. The optical disc 100 includes, at least, a substrate 101 shaped as a disc, at least one recording layer 110 formed on at least one side of the substrate 101, and a cover layer 102 formed on the substrate 101 and the recording layer 110. In the example of FIG. 1, the one recording layer 110 and the one cover layer 102 are disposed on one side of the substrate 101.

The optical disc 100 has a recording area A1 including at least partial area available to record information of an entire area of the recording layer 110, an outer area A2 located outside the recording area A1 with respect to the radial direction, and an inner area A3 located inside the recording area A1 with respect to the radial direction.

The cover layer 102 has a first thickness d1 with reference to the surface of the substrate 101, in the inside of a circle having a first radius r1 from the center of the substrate 101, and in the outside of a circle having a radius r0 smaller than the first radius r1 from the center of the substrate 101. The circle having the radius r1 is the outer circumference of the recording area, and the circle having the radius r0 is the inner circumference of the recording area. In other words, the cover layer 102 is has the first thickness d1 with reference to the surface of the substrate 101 and formed substantially flat, on the at least partial area available to record information of an entire area of the recording layer 110 (i.e., on the recording area A1 of the substrate 101).

The cover layer 102 has a second thickness d2 larger than the first thickness d1 with reference to the surface of the substrate 101, on the circumference having a second radius r2 longer than the first radius r1 from the center of the substrate 101. In this specification, a portion having the thickness d2 on the circumference having the radius r2 and the vicinity thereof are referred to as an "outer rib 103". The outer rib 103 has, for example, annular shape.

The cover layer 102 has a third thickness d3 smaller than the first thickness d1 with reference to the surface of the substrate 101, on the circumference having a third radius r3 longer than the first radius r1 and shorter than the second radius r2 from the center of the substrate 101. In this specification, a portion having the thickness d3 on the circumference having the radius r3 and the vicinity thereof are referred to as a "depression 104". The depression 104 has, for example, annular shape.

The substrate 101 has a predetermined thickness and is shaped as a disc, and has a center hole 107. In this specification, the respective sides of the substrate 101 are also referred to as "disc surfaces". The substrate 101 is formed by injection molding of a transparent thermoplastic resin such as polycarbonate. The cover layer 102 is made of an ultraviolet curable resin, and is formed on a disc surface of the substrate 101, for example, using a spin coating method. In the first embodiment, the outer rib 103 and the depression 104 are made of the same material as the cover layer 102, and integrally formed with the cover layer 102.

The outer rib 103 is disposed in the outer area A2 so as to protrude from the surface of the cover layer 102 on the recording area A1 in the normal direction of the disc surface of the substrate 101. The depression 104 is disposed between the recording area A1 and the outer rib 103 in the radial direction on the disc surface, so as to be lower than the surface of the cover layer 102 on the recording area A1 in the normal direction of the disc surface of the substrate 101.

The optical disc 100 is, for example, a Blu-ray (registered trademark) disc. The optical disc 100 is not limited thereto, and may be any other optical disc recording medium, including a substrate shaped as a disc, at least one recording layer formed on at least one side of the substrate, and a cover layer formed on the substrate and the recording layer.

Figure 3:
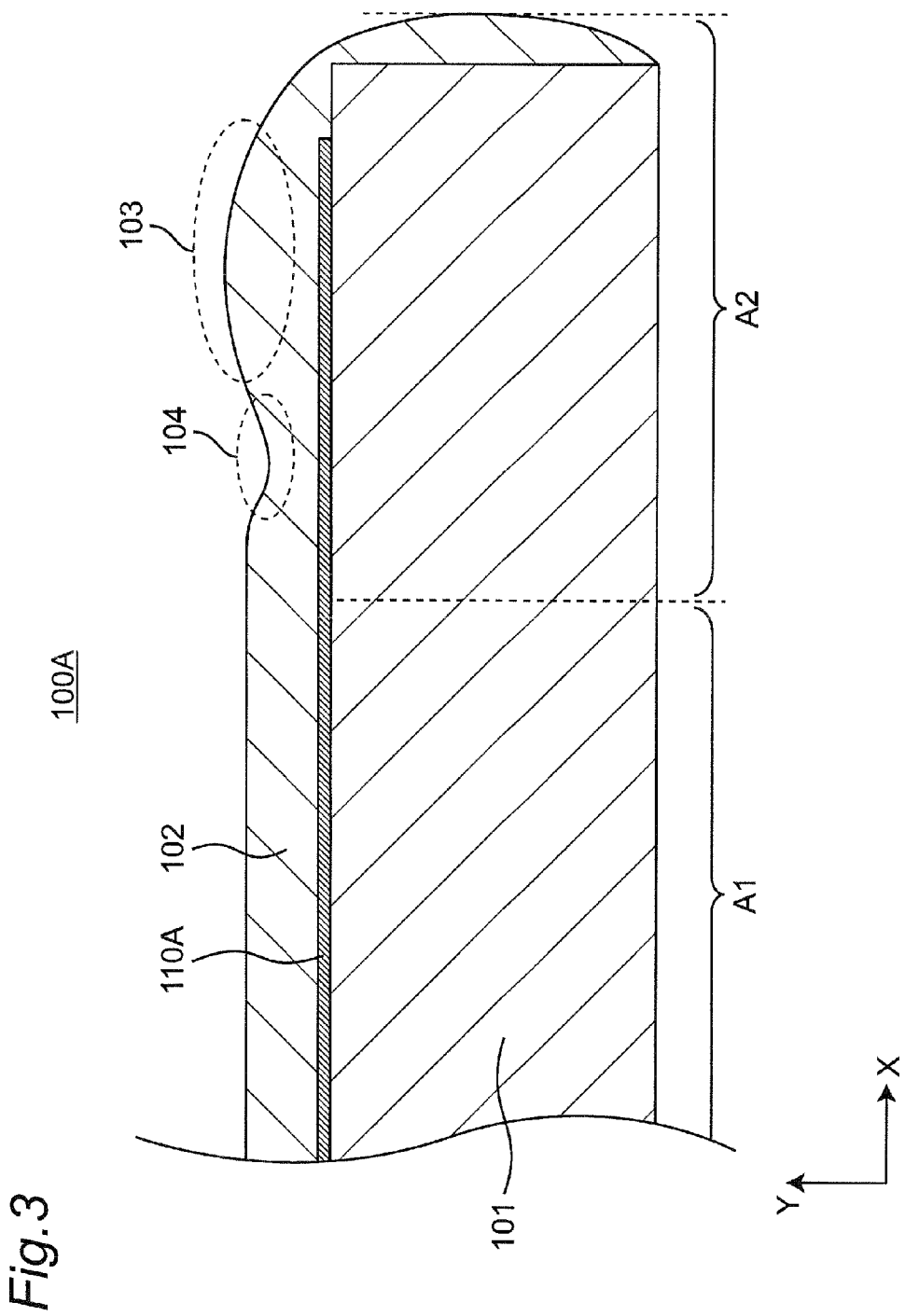
FIG. 3 is a cross-sectional view of an optical disc 100A according to a first exemplary modification of the first embodiment.

FIG. 3 is a cross-sectional view of an optical disc 100A according to a first exemplary modification of the first embodiment. The outer rib 103 and the depression 104 are not limited to being disposed in an area in which the recording layer is not formed, as shown in FIG. 1, and may be disposed on the recording layer. The optical disc 100A of FIG. 3 includes, instead of the recording layer 110 of the optical disc 100 of FIG. 1, a recording layer 110A formed to further extend towards the outer circumferential end of the optical disc 100A than the case of the recording layer 110 of FIG. 1. Although the recording layer 110A is formed as shown in FIG. 3, its entire area is not available to record the information. An area available to record information of the entire area of the recording layer 110A is defined within a predetermined radius (e.g., the radius r1 of FIG. 1) from the center of the substrate 101, in accordance with the specifications of the optical disc. The recording area A1 of FIG. 3 is the area available to record information of the entire area of the recording layer 110A, as is the case of FIG. 1. The outer rib 103 and the depression 104 are disposed in the outer area A2 located outside the recording area A1 in the radial direction, as is the case of FIG. 1.

Figure 4:
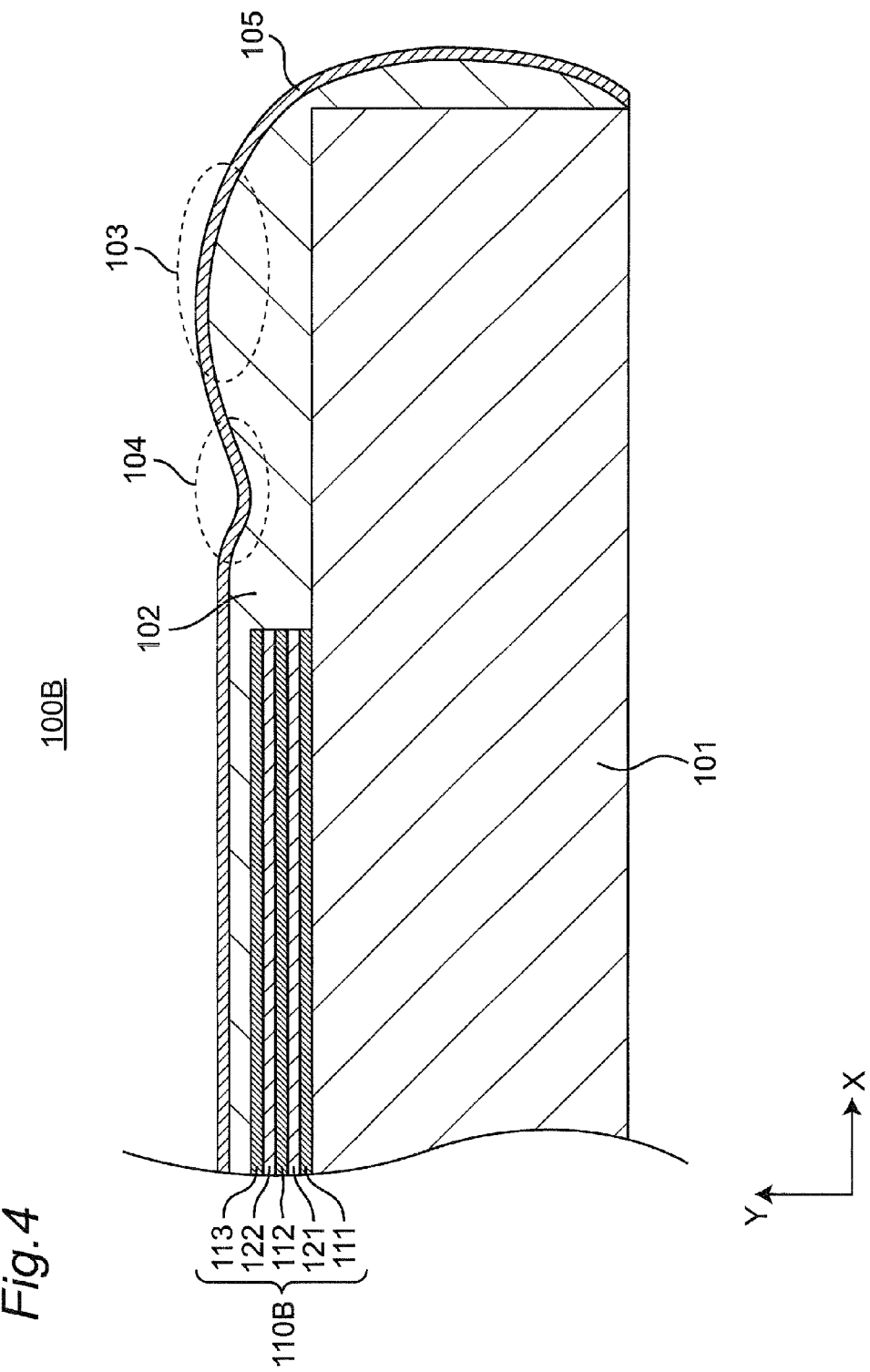
FIG. 4 is a cross-sectional view of a vicinity of an outer circumferential end of an optical disc 100B according to a second exemplary modification of the first embodiment.

FIG. 4 is a cross-sectional view of a vicinity of an outer circumferential end of an optical disc 100B according to a second exemplary modification of the first embodiment. The optical disc may be a multi-layered optical disc including a plurality of recording layers laminated with at least one intermediate layer interposed therebetween, on at least one side of a substrate. For example, the multi-layered optical disc may be a so-called three-layer optical disc, including three recording layers. The optical disc 100B of FIG. 4 includes recording layers 111 to 113 laminated with intermediate layers 121 and 122 interposed therebetween, on one side of the substrate 101. The recording layers 111 to 113 are separated from each other by the intermediate layers 121 and 122. In this specification, the recording layers 111 to 113 and the intermediate layers 121 and 122 are collectively referred to as a "laminated recording layer 110B".

As shown in FIG. 4, a hard coat layer 105 for preventing scratches may be formed on the surface of the cover layer 102.

Figure 5:
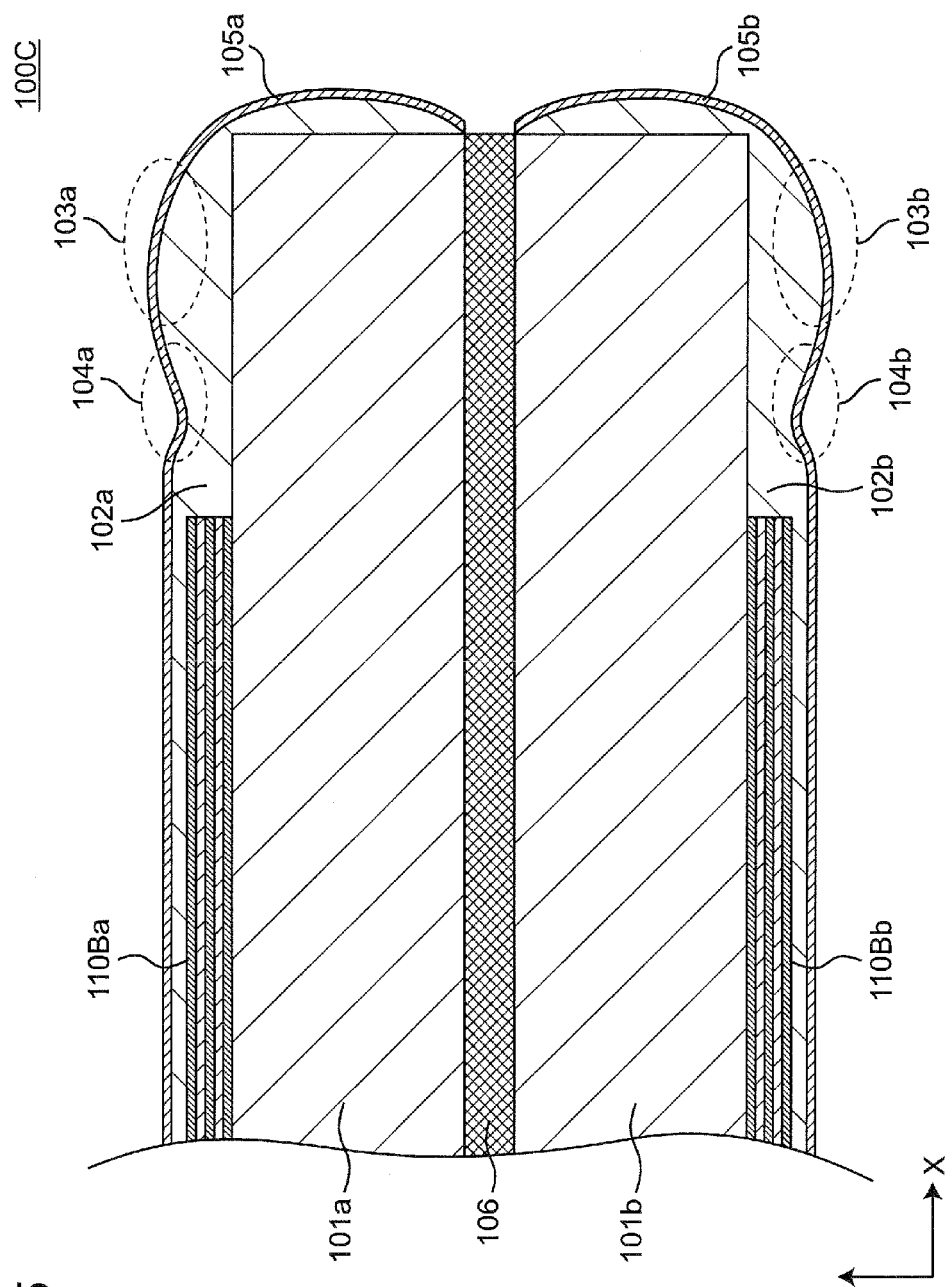
FIG. 5 is a cross-sectional view of a vicinity of an outer circumferential end of an optical disc 100C according to a third exemplary modification of the first embodiment.

FIG. 5 is a cross-sectional view of a vicinity of an outer circumferential end of an optical disc 100C according to a third exemplary modification of the first embodiment. The optical disc may be a double-sided optical disc, including recording layers and cover layers formed on both sides of the substrate for recording and playing information on the recording layers on both sides. The optical disc 100C of FIG. 5 includes two disc portions configured in a manner similar to that of the optical disc 100B of FIG. 4, and is formed by bonding these disc portions with an adhesive 106 such that the sides on which no cover layer is formed oppose to each other. The upper disc portion of the optical disc 100C includes a substrate 101a, a cover layer 102a, an outer rib 103a, a depression 104a, a hard coat layer 105a, and a laminated recording layer 110Ba. The lower disc portion of the optical disc 100C includes a substrate 101b, a cover layer 102b, an outer rib 103b, a depression 104b, a hard coat layer 105b, and a laminated recording layer 110Bb. These elements of the optical disc 100C are configured in a manner similar to that of the corresponding elements of the optical disc 100B of FIG. 4.

The double-sided optical disc is not limited to the disc portions configured in a manner similar to that of the optical disc 100B of FIG. 4, and may include disc portions configured in a manner similar to that of the optical disc 100 of FIG. 1 or the optical disc 100A of FIG. 3.

The double-sided optical disc may have an outer rib disposed on only one side, or may have outer ribs disposed on both sides.

Next, optical discs according to the prior art will be described.

Figure 6:
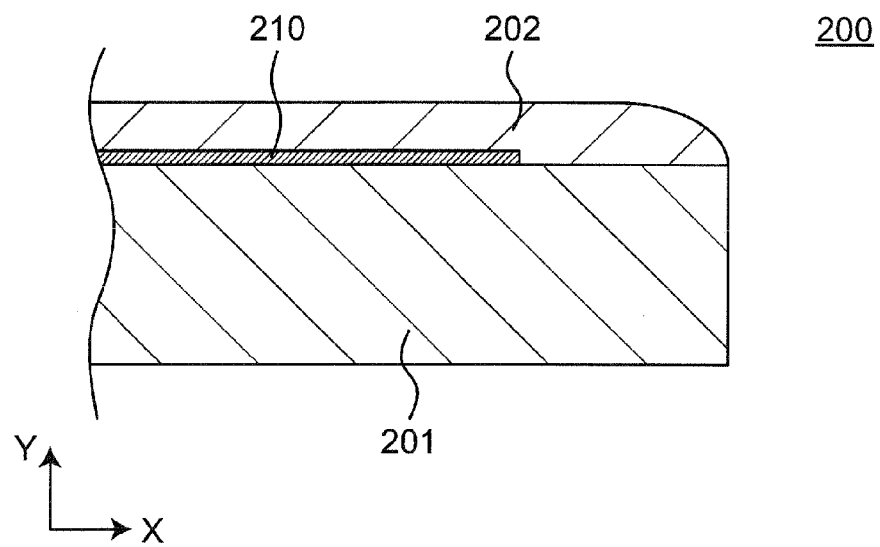
FIG. 6 is a cross-sectional view of a vicinity of an outer circumferential end of an optical disc 200 according to a first prior art.

FIG. 6 is a cross-sectional view of a vicinity of an outer circumferential end of an optical disc 200 according to a first prior art. The optical disc 200 includes a substrate 201, a cover layer 202, and a recording layer 210. In the example shown in FIG. 6, the cover layer 202 on the substrate 201 has neither an outer rib nor a depression, and the surface of the cover layer 202 is formed substantially flat.

Figure 7:
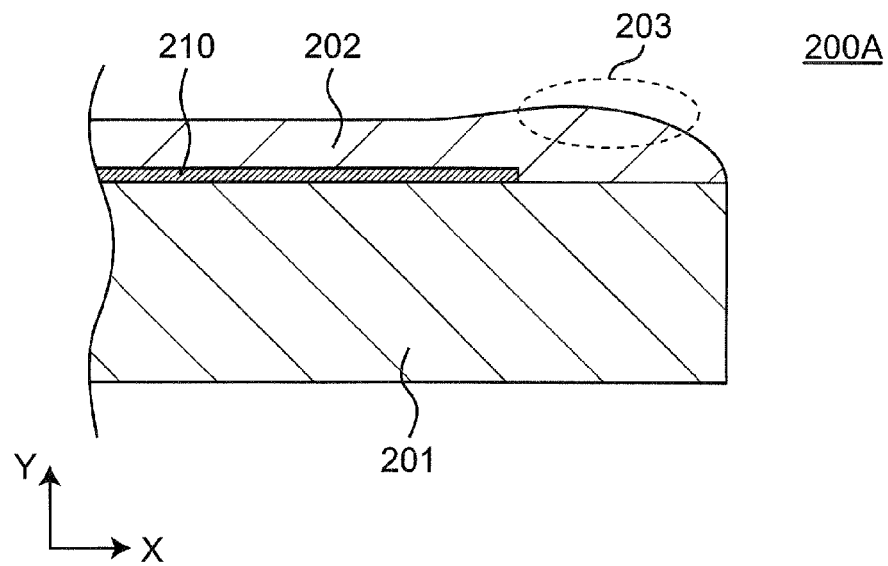
FIG. 7 is a cross-sectional view of a vicinity of an outer circumferential end of an optical disc 200A according to a second prior art.

FIG. 7 is a cross-sectional view of a vicinity of an outer circumferential end of an optical disc 200A according to a second prior art. The optical disc 200A includes a low and slightly raised portion 203 in the vicinity of the outer circumferential end of the cover layer 202 on the substrate 201, due to deformation in the material of the cover layer 202 during a manufacturing process. In the example shown in FIG. 7, although there is the raised portion 203, no depression is formed inside the raised portion 203.

Figure 8:
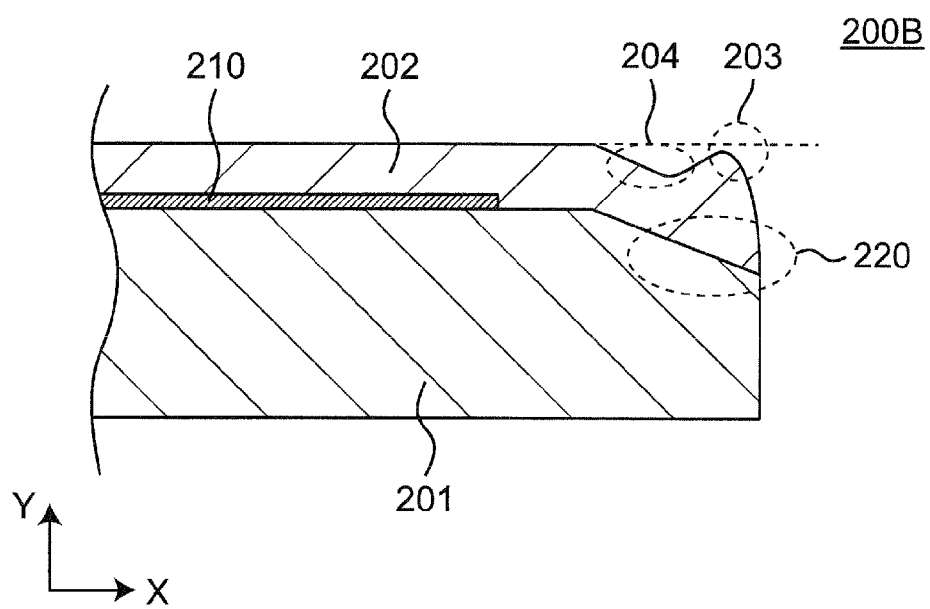
FIG. 8 is a cross-sectional view of a vicinity of an outer circumferential end of an optical disc 200B according to a third prior art.

FIG. 8 is a cross-sectional view of a vicinity of an outer circumferential end of an optical disc 200B according to a third prior art. The optical disc 200B includes an inclined surface 220 formed such that the thickness of the substrate 201 is gradually reduced as approaching the edge along the radial direction, and the cover layer 202 is formed to be bent along the inclined surface 220 of the substrate 201. As a result, even if the raised portion 203 appears due to deformation in the material of the cover layer 202 during a manufacturing process, tips of the raised portion 203 does not protrude from the surface of the cover layer 102 on the recording layer 210, in the normal direction of the disc surface of the substrate 201. Therefore, it is possible to manufacture the flat optical disc 200B without protrusion of the raised portion 203. Since the cover layer 202 is bent along the inclined surface 220 of the substrate 201, a depression 204 is formed inside the raised portion 203.

Next, a problem of optical discs according to the prior art will be described from the viewpoint of usage of the optical discs.

In a data center, many large-capacity optical discs may be used for storage or backup of cold data to be stored for a long term. In this case, in order to store an enormous number of optical discs as compact as possible, the optical discs are stacked without a gap.

Figure 9:
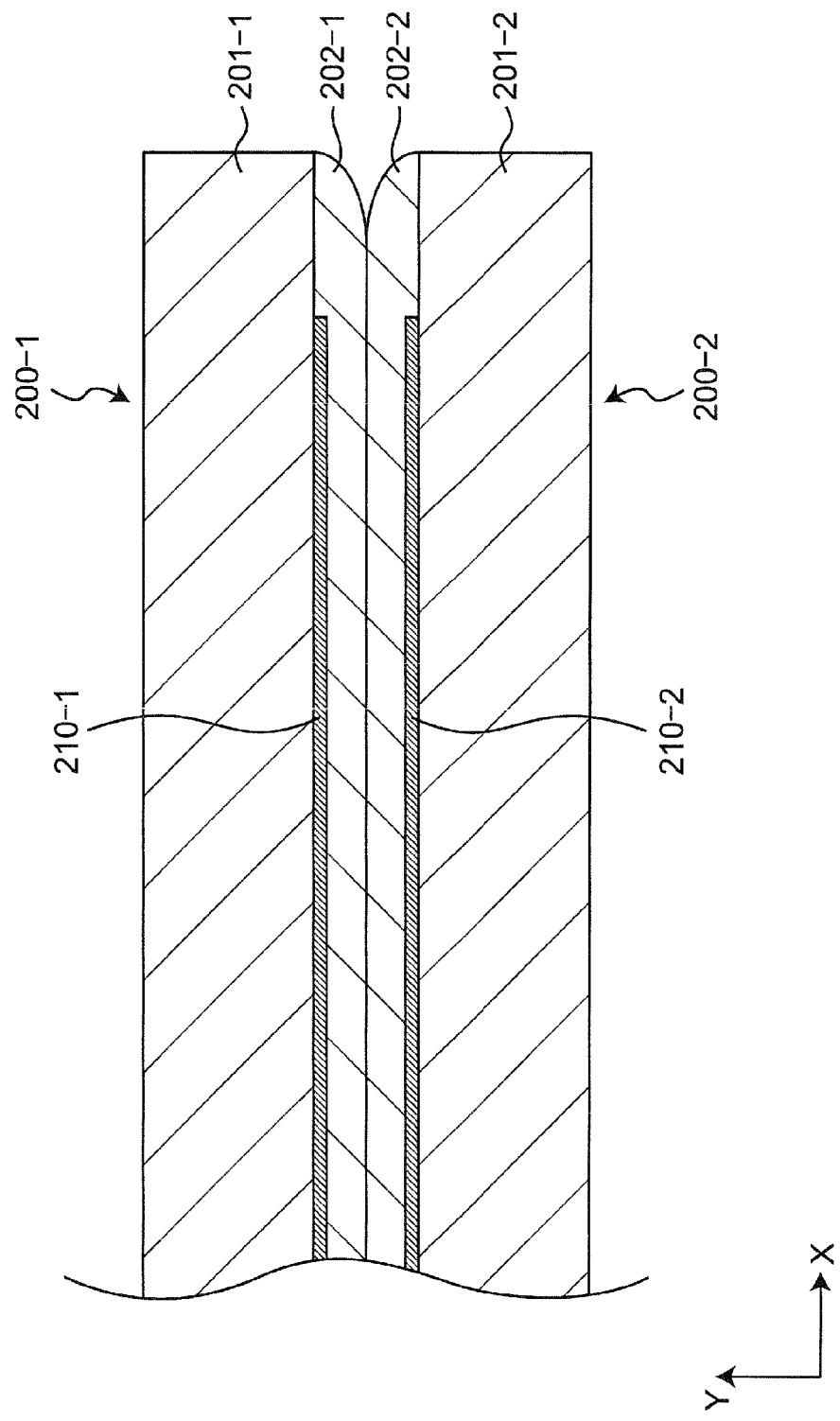
FIG. 9 is a cross-sectional view of a vicinity of an outer circumferential end of optical discs 200-1 and 200-2 according to a prior art, which are stacked with each other.

FIG. 9 is a cross-sectional view of a vicinity of an outer circumferential end of optical discs 200-1 and 200-2 according to a prior art, which are stacked with each other. Each of the optical discs 200-1 and 200-2 is configured in a manner similar to that of the optical disc 200 of FIG. 6. The optical disc 200-1 includes a substrate 201-1, a cover layer 202-1, and a recording layer 210-1. The optical disc 200-2 includes a substrate 201-2, a cover layer 202-2, and a recording layer 210-2.

The surfaces of the cover layers of the optical discs are formed with high smoothness, for stably recording or playing data without disturbing recording or playing lights. When the optical discs are stored in a stacked manner, the optical discs may adhere to each other because of their high smoothness, and therefore, may be difficult to be separated from each other. Particularly, when using large-capacity double-sided optical discs, the optical discs are stacked with the surfaces of the cover layers brought into close contact with each other, and therefore, the tendency of the optical discs to adhere to each other increases.

In such a case, when any of the stacked and stored optical discs to be picked out for recording or playing data, it is not possible to pick out one optical disc, possibly resulting in a serious trouble of a recorder and player apparatus.

As a result of studies by the present inventors, it is found out that the above described problem of the adherence of the stacked optical discs is due to high smoothness of the surfaces of the cover layers. The adherence of the optical discs may be alleviated by reducing the smoothness of the surfaces of the cover layers. However, the smoothness cannot be reduced, because of significant adverse effects, such as scattering of the recording or playing lights. In addition, raised portions (ribs or protrusions) as shown in FIG. 7 may be disposed on the outer circumferential portions of the optical discs. However, if the sufficiently high raised portions are disposed for alleviating the adherence of the optical discs, a conventional recorder and player apparatus may cause a collision of its pickup with the raised portions.

Therefore, the optical disc 100 according to the first embodiment includes the outer rib 103 protruding from the surface of the cover layer 102 on the recording area A1, and the depression 104 lower than the surface of the cover layer 102 on the recording area A1.

Figure 10:
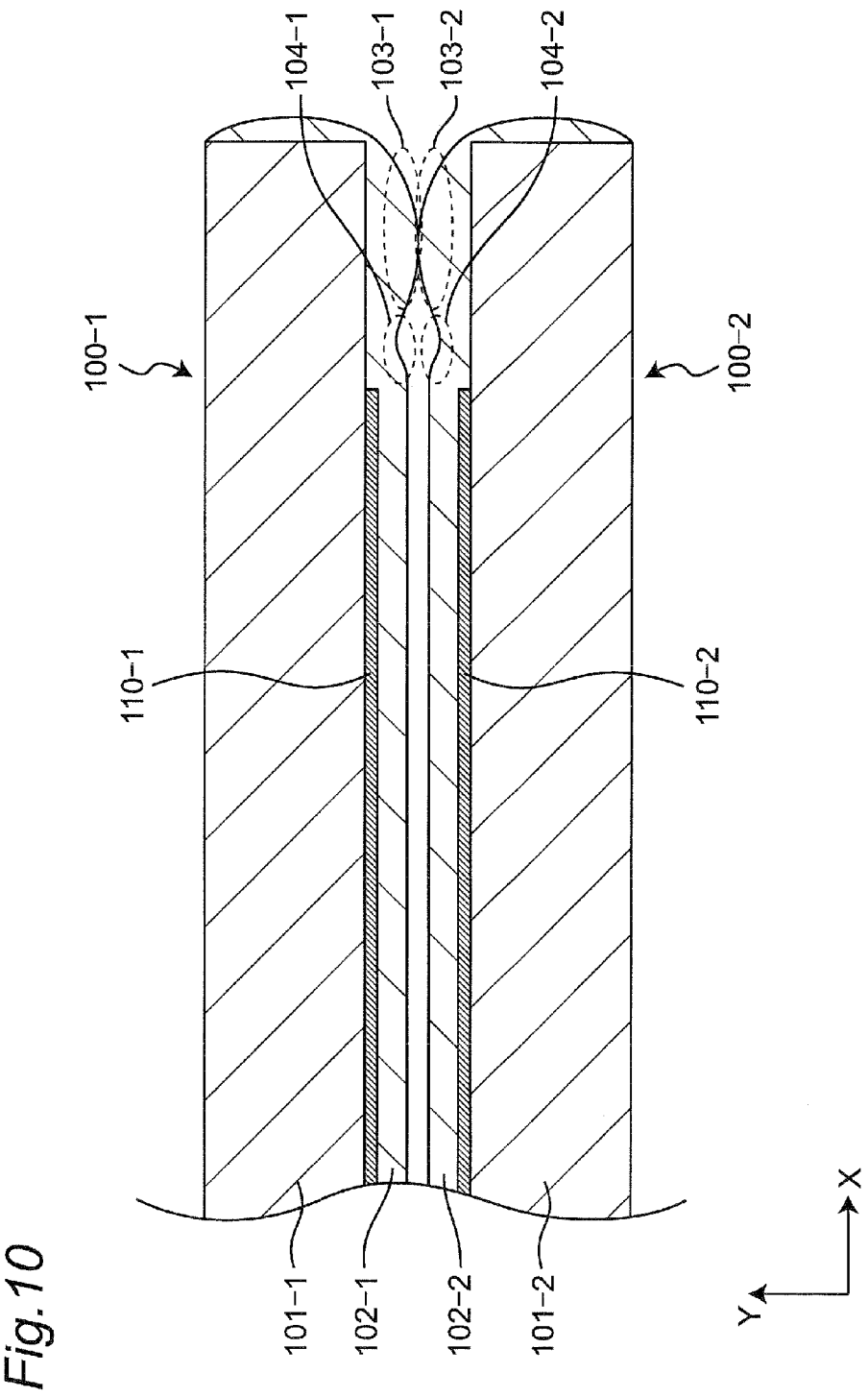
FIG. 10 is a cross-sectional view of a vicinity of an outer circumferential in of optical discs 100-1 and 100-2 according to an embodiment, which are stacked with each other.

FIG. 10 is a cross-sectional view of a vicinity of an outer circumferential end of optical discs 100-1 and 100-2 according to an embodiment, which are stacked with each other. Each of the optical discs 100-1 and 100-2 is configured in a manner similar to that of the optical disc 100 of FIG. 1. The optical disc 100-1 includes a substrate 101-1, a cover layer 102-1, an outer rib 103-1, a depression 104-1, and a recording layer 110-1. The optical disc 100-2 includes a substrate 101-2, a cover layer 102-2, an outer rib 103-2, a depression 104-2, and a recording layer 110-2.

FIGS. 9 and 10 compare whether or not to include the outer rib and the depression, when the optical discs are stacked with the cover layers brought into contact with each other. In the case of the optical discs 100-1 and 100-2 of FIG. 10, since the outer ribs 103-1 and 103-2 are disposed in the outer area A2, it is possible to reduce the areas brought into close contact with each other on the cover layers 102-1 and 102-2 when the optical discs 100-1 and 100-2 are stacked. Therefore, it is possible to alleviate the adherence of the optical discs 100-1 and 100-2, so as to easily separate the optical discs from each other.

The higher the outer rib 103 is formed, the more effectively the adherence of the optical disc is alleviated. However, if the outer rib 103 is formed too high, the outer rib 103 collides with a pickup head of the recorder and player apparatus even when the outer rib 103 is disposed outside the recording area A1. The allowable maximum height of the outer rib 103 with respect to the surface of the cover layer 102 on the recording area A1 (i.e., d2−d1) depends on an amount of circumferential variation in warpage of the optical disc, and depends on a performance and a shape of the pickup head. This allowable maximum height is about 120 µm in the case of a Blu-ray disc. When considering possibilities of increasing a numerical aperture of a lens of the pickup head, and reducing an operating distance between the pickup head and the optical disc, in order to achieve a higher density in the future, it is expected the allowable maximum height is about 80 µm.

The strength of adherence of the optical discs depends on the number of stacked and stored optical discs, a pressure applied in the direction perpendicular to the disc surfaces during the storage, a humidity during the storage, etc. Therefore, it is considered that the outer rib of about 80 μm in height may be insufficient to provide a margin for eliminating the adherence of the optical discs.

Therefore, in this disclosure, the outer rib 103 is formed, and further, the depression 104 is formed inside the outer rib 103. Since the depression 104 is disposed, it is possible to effectively alleviate the adherence between the optical discs as in the case of increasing the height of the outer rib 103, without actually increasing the height of the outer rib 103 with respect to the surface of the cover layer 102 on the recording area A1. Additionally, even when the optical discs come into close contact with each other because the optical discs are stacked, the presence of the depression 104 reduces the area of close contact and facilitates the separation of the optical discs from each other.

The optical disc may have, for example, an outer diameter of about 120 mm, an inner diameter of about 15 mm, and a thickness of about 1.1 to 1.5 mm. The outer circumference of the recording area A1 may have the radius of r1=58.5 mm. As a result, high compatibility with conventional CDs, DVDs, and Blu-ray discs are achieved. In this case, the outer rib and the depression may be formed, for example, outside the position at the radius of 58.5 mm from the center of the optical disc. As a result, the outer rib and the depression less interfere with the recording area A1, and less affect the recording or playing lights.

The cover layer may have, for example, the first thickness d1=95 to 105 μm, averaged on the recording area A1. The first thickness d1 may have, for example, a tolerance of +/−2 μm on the recording area A1. The height of the outer rib 103 with respect to the surface of the cover layer 102 on the recording area A1 (i.e., d2−d1) may be set to, for example, any value of a range from about 40 μm to about 120 μm, averaged on the circumference having the radium r2, so as to avoid a collision of the outer rib 103 and the pickup head. The height of the outer rib 103 may be set to, for example, any value of a range from about 60 μm to about 80 μm, averaged on the circumference having the radium r2. The height of the outer rib 103 may have, for example, a tolerance of +/−20 μm on the circumference having the radium r2. The depth of the depression 104 with respect to the surface of the cover layer 102 on the recording area A1 (i.e., d1−d3) may be set to, for example, about 10 μm to about 20 μm, averaged on the circumference having the radium r3. The depth of the depression 104 may have, for example, a tolerance of +/−20 μm on the circumference having the radium r3 (it is noted that the bottom of the depression 104 does not protrude from the surface of the cover layer 102 on the recording area A1). The depth of the depression 104 may change in response to the change of the height of the outer rib 103. In any case, the outer rib 103 is formed to protrude from the surface of the cover layer 102 on the recording area A1 (d2>d1), and the depression 104 is formed lower than the surface of the cover layer 102 on the recording area A1 (d1>d3).

FIG. 10 shows the case in which the two optical discs 100-1 and 100-2 each having one recording layer 110-1, 110-2 on one side are stacked such that their recording layers 110-1 and 110-2 oppose to each other. However, even when a plurality of optical discs each having one recording layer on one side are stacked such that the side with the recording layer and the side without the recording layer oppose to each other, the same effect as the example of FIG. 10 is obtained. Even when a plurality of optical discs each having respective recording layers on both sides are stacked, the same effect as the example of FIG. 10 is obtained.

The optical discs 200A, 200B according to the prior art shown in FIGS. 7 and 8 cannot eliminate the adherence of the optical discs because of the following reasons. First, the optical disc 200A of FIG. 7 does not have a sufficient height of the raised portion 203 corresponding to the rib, and there is no depression inside the rib. The optical disc 200B of FIG. 8 is formed such that the tips of the raised portion corresponding to the rib do not protrude from the surface of the cover layer 202 on the recording layer 210. Additionally, the optical disc 200B of FIG. 8 has the depression 204 following the deformation of the substrate 201, and actually, the thickness of the cover layer 202 is the same between the depression 204 and the periphery thereof. Therefore, even though the optical disc 200B of FIG. 8 includes the depression 204, the optical disc 200B of FIG. 8 cannot produce the performance like the optical disc according to the first embodiment.

The configurations and effects of the optical disc recording medium according to the first embodiment are as follows.

The optical disc 100 according to the first embodiment includes the substrate 101 shaped as a disc, the at least one recording layer 110 formed on at least one side of the substrate 101, and a cover layer 102 formed on the substrate 101 and the recording layer 110. The cover layer 102 has the first thickness d1 with reference to the surface of the substrate 101, in the inside of a circle having the first radius r1 from the center of the substrate 101. The cover layer 102 has the second thickness d2 larger than the first thickness d1 with reference to the surface of the substrate 101, on the circumference having the second radius r2 longer than the first radius r1 from the center of the substrate 101. The cover layer 102 has the third thickness d3 smaller than the first thickness d1 with reference to the surface of the substrate 101, on the circumference having the third radius r3 longer than the first radius r1 and shorter than the second radius r2 from the center of the substrate 101.

With the configuration as described above, it is possible to alleviate or eliminate the adherence between optical discs when the optical discs are stored in a stacked manner, and it is possible to easily separate the optical discs even when optical discs adhere to each other.

In the optical disc 100 according to the first embodiment, the cover layer 102 has the first thickness d1 with reference to the surface of the substrate 101, on at least partial area available to record information of an entire area of the recording layer 110.

Therefore, it is possible to dispose the outer rib and the depression without affecting the recording and playing of information in the recording area.

In the optical disc 100 according to the first embodiment, a difference between the second thickness d2 and the first thickness d1 is 120 μm or less.

Therefore, it is possible to dispose the outer rib 103 without causing a collision with the pickup head of the recorder and player apparatus.

The optical disc 100 according to the first embodiment includes a plurality of the recording layers 111 to 113 laminated with the at least one intermediate layer 121 and 122 interposed therebetween, on at least one side of the substrate 101.

The optical disc 100 according to the first embodiment includes the recording layer 110 and the cover layer 102 formed on each of both sides of the substrate 101.

Therefore, it is possible to increase the capacity of the optical disc.

Second Embodiment

Figure 11:
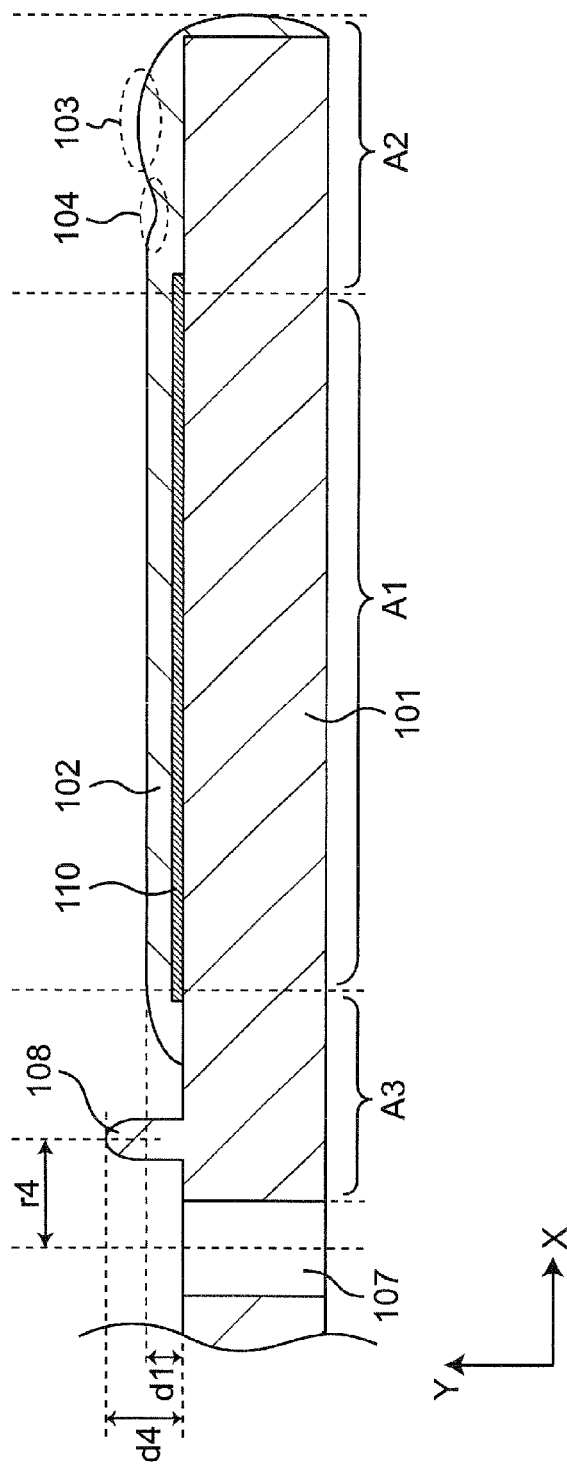
FIG. 11 is a cross-sectional view of an optical disc 100D according to a second embodiment.

FIG. 11 is a cross-sectional view of an optical disc 100D according to a second embodiment. The optical disc 100D includes an annular rib 108 having a fourth height d4 larger than the first thickness d1 with reference to the surface of the substrate 101, on the circumference having a fourth radius r4 shorter than the first radius r1 from the center of the substrate 101. In this specification, a portion having the height d4 on the circumference having the radius r4 and the vicinity thereof are referred to as an "inner rib 108". The other portions of the optical disc 100D are configured in a manner similar to that of the optical disc 100 of FIG. 1.

As shown in FIG. 11, when the optical disc 100D includes the inner rib 108 in addition to the outer rib 103, it is possible to further improve the performance of alleviating and preventing the adherence between the optical discs, as compared to that of the first embodiment.

The height of the outer rib 103 and the height of the inner rib 108 with respect to the surface of the cover layer 102 on the recording area A1 may be the same to each other, or different from each other. The height of the outer rib 103 and the height of the inner rib 108 may be set to substantially the same height, in consideration of how a load is applied when the optical discs are stored in a stacked manner. For example, the height of the outer rib 103 with respect to the surface of the cover layer 102 on the recording area A1 may be set to about 70 μm, and the height of the inner rib 108 with respect to the surface of the cover layer 102 on the recording area A1 may be set to about 65 μm.

The configurations and effects of the optical disc recording medium according to the second embodiment are as follows.

The optical disc 100D according to the second embodiment further includes the annular rib 108 having the fourth height d4 larger than the first thickness d1 with reference to the surface of the substrate 101, on the circumference having the fourth radius r4 shorter than the first radius r1 from the center of the substrate 101.

As a result, as compared to the first embodiment, it is possible to more reliably alleviate or eliminate the adherence between optical discs when the optical discs are stored in a stacked manner, and it is possible to separate the optical discs even when the optical discs adhere to each other.

(Manufacturing Method of Optical Disc According to Embodiment)

Next, a manufacturing method of the optical disc according to the embodiment will be described.

A process of manufacturing the optical disc includes a plurality of steps. The respective steps will be described with reference to the figures.

Figure 12:
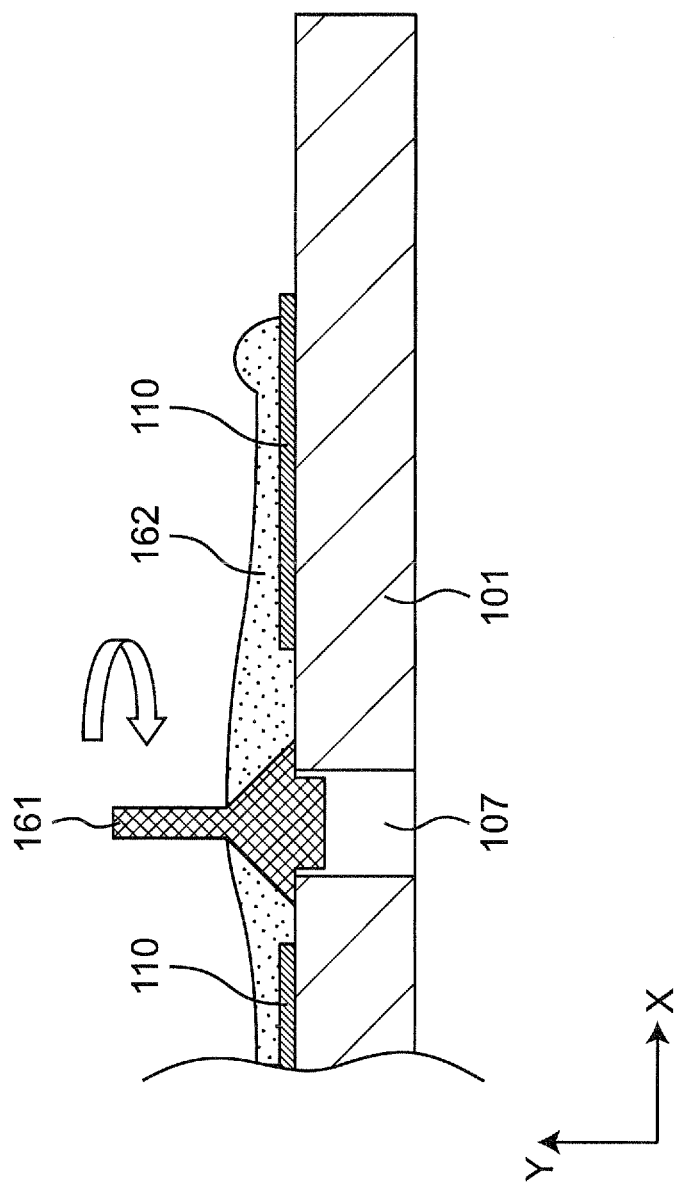
FIG. 12 is a cross-sectional view at a first step of a manufacturing process of the optical disc according to the first embodiment.

FIG. 12 is a cross-sectional view at a first step of a manufacturing process of the optical disc according to the first embodiment. As shown in FIG. 12, a center cap 161 is disposed at the center hole 107 of the substrate 101, an ultraviolet curable resin 162 is dropped on the center cap 161, and the ultraviolet curable resin 162 is spread toward the outer edge using the spin coating method. The rotation speed and the rotation duration of the spin coating are selected so as to achieve a desired thickness of the cover layer. The substrate 101 has the recording layer 110 formed in advance. Alternatively, the substrate 101 may have a plurality of recording layers and at least one intermediate layer formed in advance.

Figure 13:
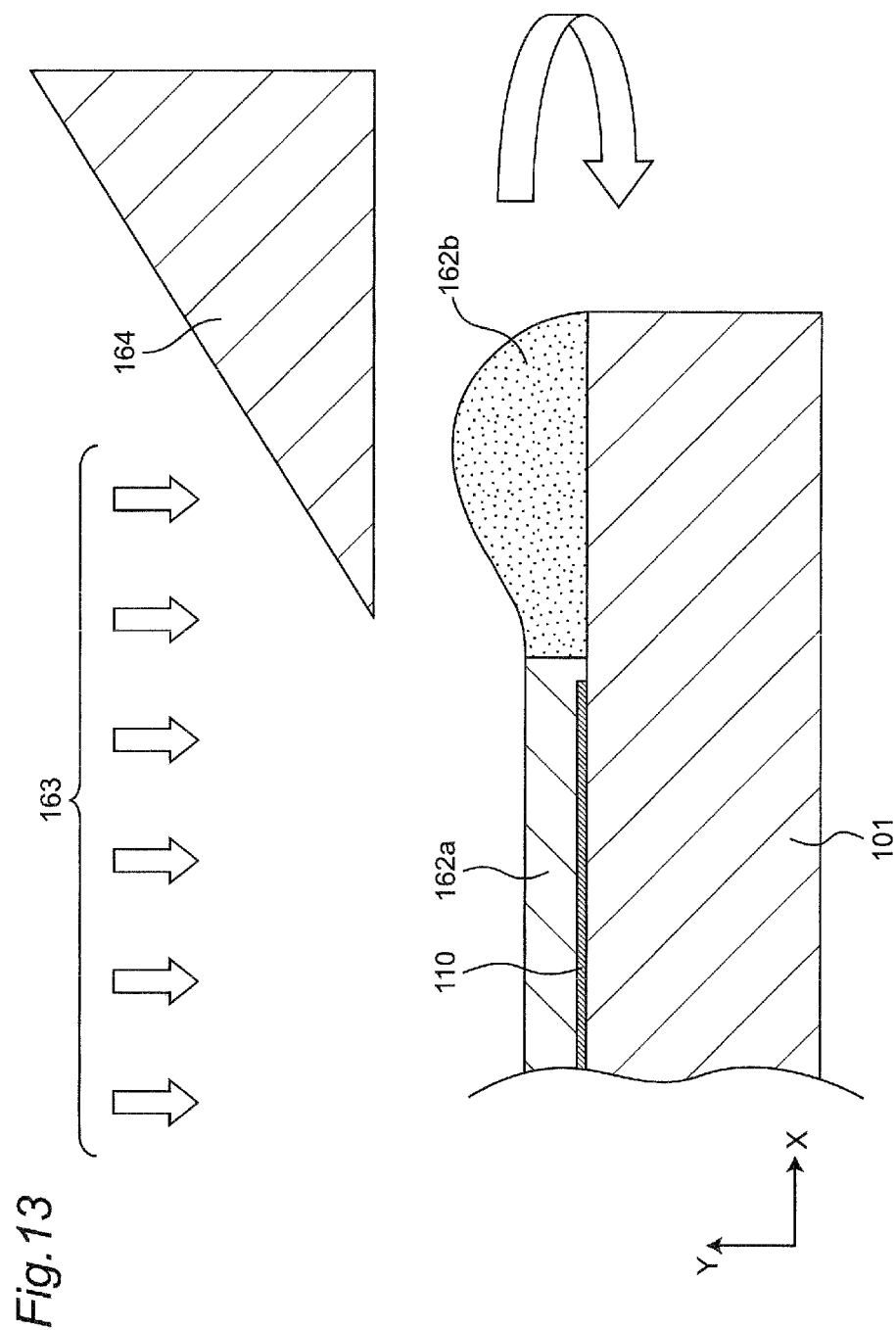
FIG. 13 is a cross-sectional view of a vicinity of an outer circumferential end at a second step of the manufacturing process of the optical disc according to the first embodiment.

FIG. 13 is a cross-sectional view of a vicinity of an outer circumferential end at a second step of the manufacturing process of the optical disc according to the first embodiment. Subsequent to the step of FIG. 12, on the recording area A1 including at least partial area available to record information of an entire area of the recording layer 110, an ultraviolet light 163 is irradiated to the ultraviolet curable resin 162 to form a cured ultraviolet curable resin 162a. In this operation, a portion corresponding to the outer rib 103 and the depression 104 is shaded using a shading mask 164, and is kept in an uncured or weakly cured state (as an uncured ultraviolet curable resin 162b). If the rotation of the substrate 101 is completely stopped when the ultraviolet light 163 is irradiated to the ultraviolet curable resin 162, the thickness of the cover layer 102 of the recording area A1 may become uneven, and therefore, the ultraviolet curable resin 162 may be cured by irradiating the ultraviolet light 163 while being rotated. However, if the substrate 101 is rotated too fast, the uncured ultraviolet curable resin 162b may scatter to the outside of the substrate 101, and therefore, the rotational speed may be selected based on the viscosity of the ultraviolet curable resin 162.

Figure 14:
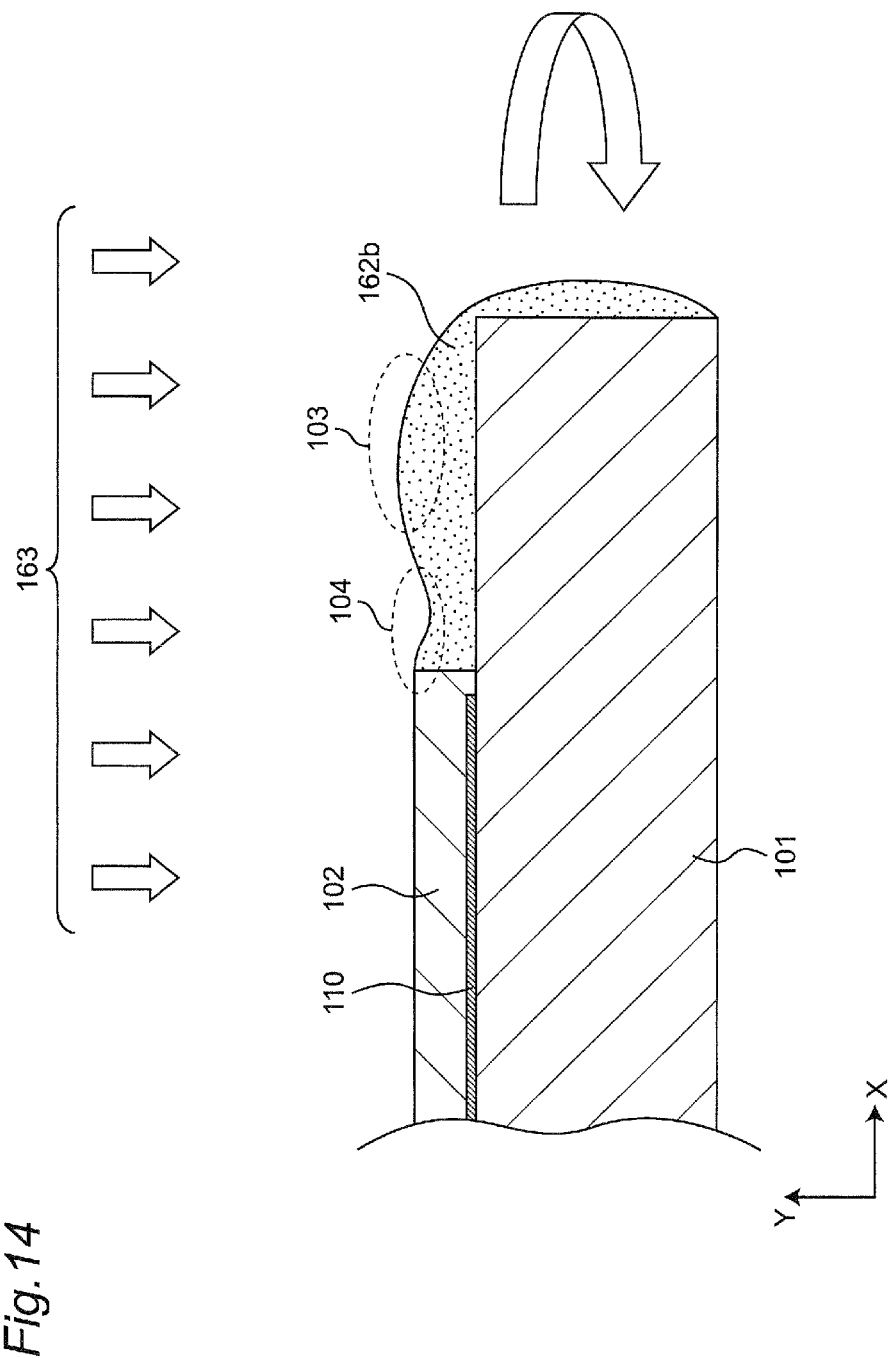
FIG. 14 is a cross-sectional view of a vicinity of an outer circumferential end at a third step of the manufacturing process of the optical disc according to the first embodiment.

FIG. 14 is a cross-sectional view of a vicinity of an outer circumferential end at a third step of the manufacturing process of the optical disc according to the first embodiment. Subsequent to the step of FIG. 13, the substrate 101 is rotated to form the outer rib 103 and the depression 104 having desired height and depth, respectively. Generally, the faster the substrate 101 is rotated, the deeper the depression 104 is formed, and the slower the substrate 101 is rotated, the shallower the depression 104 is formed. While keeping the rotation of the substrate 101, the shading mask 164 of FIG. 13 is removed, and the ultraviolet light 163 is irradiated to cure the uncured ultraviolet curable resin 162b shaded from the light at the step of FIG. 13, thus forming the outer rib 103 and the depression 104. By setting the rotation speed and the acceleration/deceleration duration of the substrate 101 in accordance with the viscosity of the ultraviolet curable resin 162, it is possible to adjust the height of the outer rib 103 and the depth of the depression 104 to some extent, and form the outer rib 103 and the depression 104 with the optimum performance.

The manufacturing method of FIGS. 12 to 14 eliminates the need for a complicated process, such as deforming the substrate 101.

A hard coat layer may be formed in order to further harden the surface of the optical disc. By harden the surfaces of the optical discs by the hard coat layer, it is possible to further alleviate the adherence of the optical disc when stacked.

Moreover, the outer rib 103 and the depression 104 may be formed by a manufacturing method different from the manufacturing method of FIGS. 12 to 14. For example, a doughnut-shaped outer rib may be separately formed, and then attached to the substrate 101. The depression 104 may be formed by cutting the inside of the outer rib 103. These methods can produce the same effects, such as the alleviation of the adherence between optical discs, and the easy separation when adhering.

The manufacturing method of the optical disc 100 according to the first embodiment has been described with reference to FIGS. 12 to 14. The optical disc 100D according to the second embodiment is also manufactured in the similar manner. The inner rib 108 of the optical disc 100D may be formed integrally with the substrate 101 before forming the cover layer 102, or the doughnut-shaped inner rib 108 may be separately formed, and then attached to the substrate 101.

The other portions of the optical disc 100D may be formed using the manufacturing method of FIGS. 12 to 14.

OTHER EMBODIMENTS

The first and second embodiments have been described above as examples of the techniques disclosed by this application. However, the techniques of this disclosure are not limited thereto, and are applicable to embodiments with appropriate modification, replacement, addition, omission, and so on. The elements described in the first and second embodiments can be combined to form a new embodiment.

The embodiments have been described as examples of the techniques in this disclosure. The accompanying drawings and the detailed description have been provided for this purpose.

Therefore, the elements described in the accompanying drawings and the detailed description may include not only the elements essential for solving the problem, but also elements exemplarily describing the techniques and not essential for solving the problem. Therefore, even though these non-essential elements are included in the accompanying drawings and the detailed description, these non-essential elements should not immediately be recognized as being essential.

Since the embodiments described above are intended to exemplarily describe the techniques of this disclosure, various modifications, replacements, additions, and omissions can be made within the claims and the scope equivalent thereto.

The optical disc recording medium of this disclosure enables the alleviation or prevention of adherence between optical discs when the optical discs are stored in a stacked manner, and enables easy separation when adhering. Therefore, the optical disc recording medium is particularly applicable to a use requiring long-term storage in a data center, etc.

The optical disc recording medium of this disclosure is particularly applicable to a double-sided optical disc recording medium with a large capacity.

The invention claimed is:

1. An optical disc recording medium comprising:
   a substrate shaped as a disc;
   at least one recording layer formed on at least one side of the substrate; and
   a cover layer formed on the substrate and the recording layer,
   wherein the cover layer has a first thickness, with reference to a surface of the substrate, in an inside of a circle having a first radius from a center of the substrate,
   wherein the cover layer includes a first annular rib having a second thickness larger than the first thickness, with reference to the surface of the substrate, on a circumference having a second radius longer than the first radius and shorter than a radius of the substrate from the center of the substrate,
   wherein the cover layer has a third thickness smaller than the first thickness, with reference to the surface of the substrate, on a circumference having a third radius longer than the first radius and shorter than the second radius from the center of the substrate, and
   wherein, when a plurality of optical disc recording media are stacked with each other, the first annular rib of each of the optical disc recording media is in contact with one of the other optical disc recording media, and the cover layer of each of the optical disc recording media except for the first annular rib is not in contact with the other optical disc recording media.

2. The optical disc recording medium as claimed in claim 1, wherein the cover layer has the first thickness with reference to the surface of the substrate, on at least a partial area available to record information of an entire area of the recording layer.

3. The optical disc recording medium as claimed in claim 1, wherein a difference between the second thickness and the first thickness is 120 µm or less.

4. The optical disc recording medium as claimed in claim 1, further comprising a second annular rib having a fourth height larger than the first thickness, with reference to the surface of the substrate, on a circumference having a fourth radius shorter than the first radius from the center of the substrate.

5. The optical disc recording medium as claimed in claim 1, further comprising a plurality of recording layers, laminated with at least one intermediate layer interposed therebetween, on at least one side of the substrate.

6. The optical disc recording medium as claimed in claim 1, further comprising a recording layer and a cover layer formed on a second side of the substrate.

\* \* \* \* \*